UNITED STATES PATENT OFFICE.

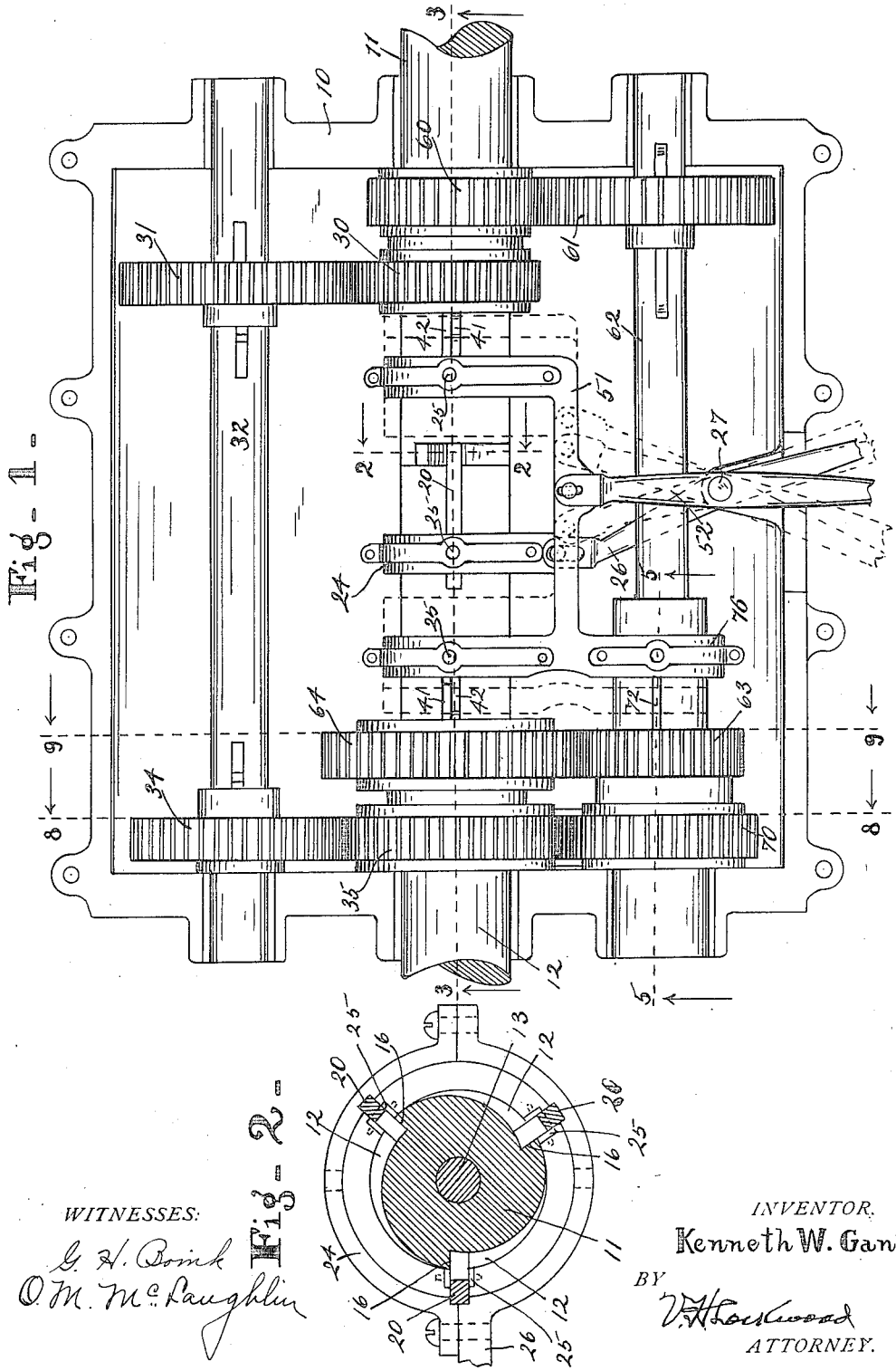

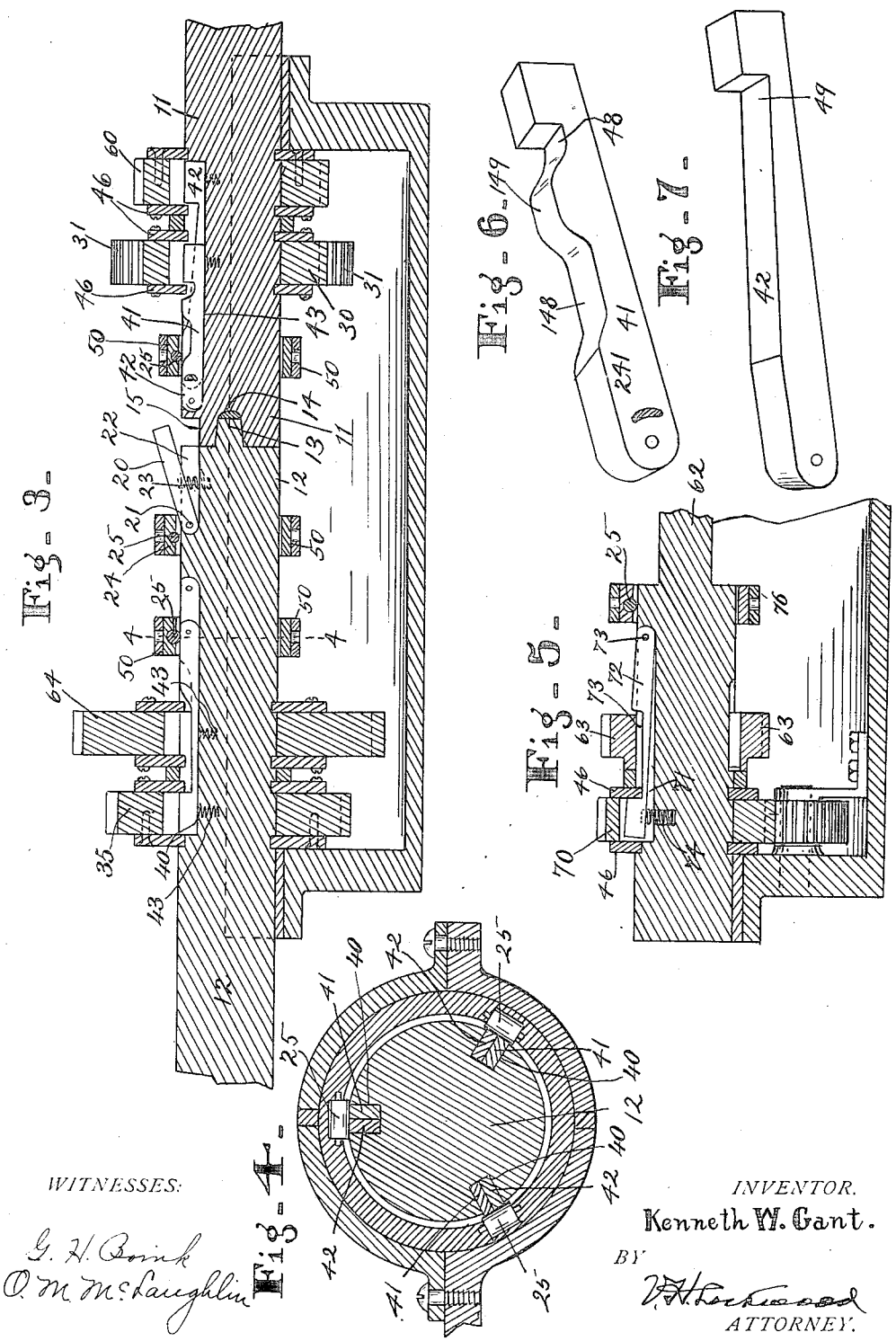

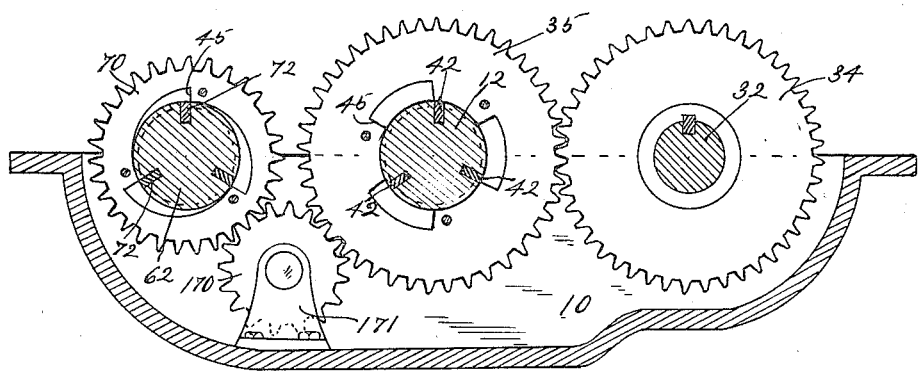
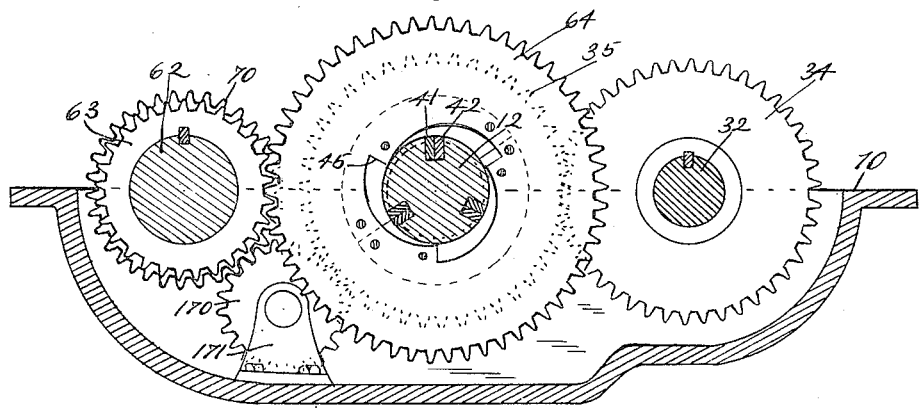
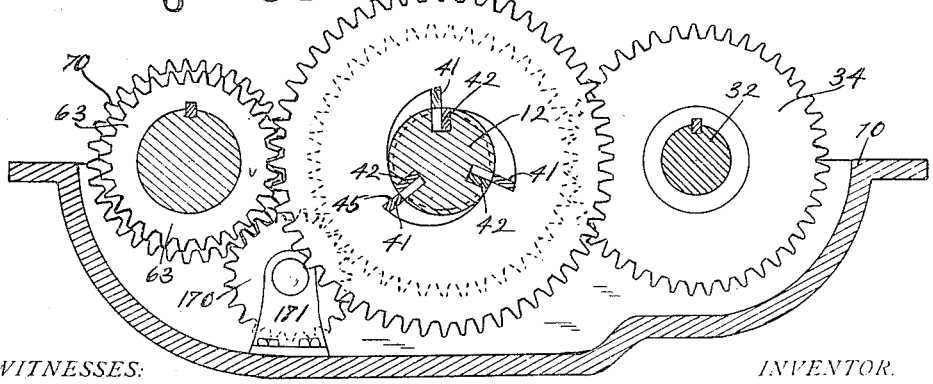

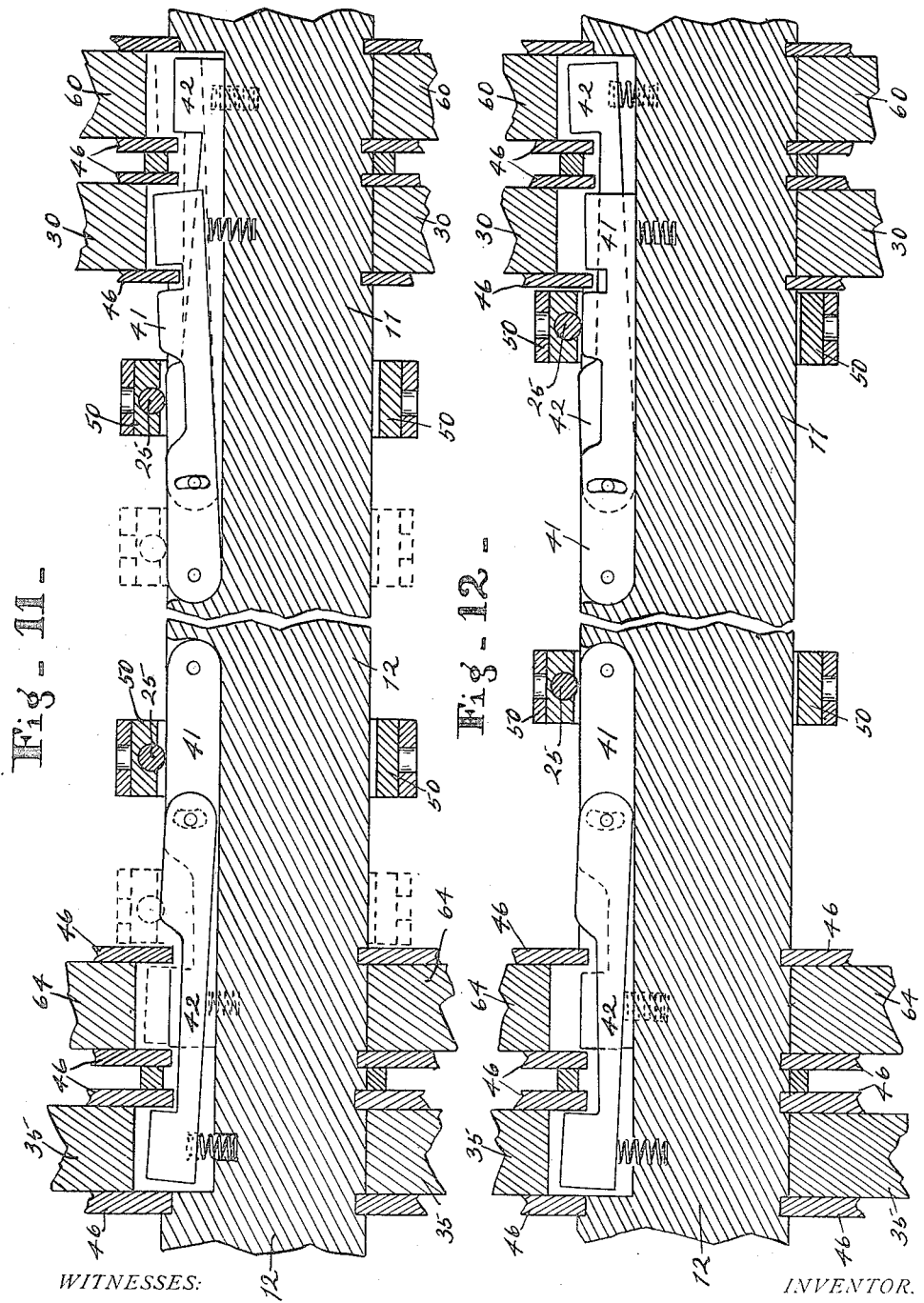

KENNETH W. GANT, OF INDIANAPOLIS, INDIANA, ASSIGNOR OF TEN ONE-HUNDREDTHS TO HARRY B. WARREN AND FIFTY ONE-HUNDREDTHS TO CHARLES BECKER, OF INDIANAPOLIS, INDIANA.

CHANGE-SPEED MECHANISM.

971,883.  Specification of Letters Patent.  Patented Oct. 4, 1910.

Application filed January 14, 1909. Serial No. 472,223.

*To all whom it may concern:*

Be it known that I, KENNETH W. GANT, of Indianapolis, county of Marion, State of Indiana, have invented a certain new and useful Change-Speed Mechanism; and I do hereby declare that the following is a full, clear, and exact description thereof, reference being had to the accompanying drawings, in which like letters refer to like parts.
The object of this invention is to provide an improved change speed gearing mechanism, especially for automobiles and the like, wherein the gear wheels are always in mesh and are never moved into and out of engagement with each other.

The chief feature of the invention consists in providing pivoted clutch keys embedded in the shafts and spring-actuated outwardly so as to be moved into engagement with the different gear wheels for changing speeds, and a laterally sliding ring or the like for depressing some or all of the keys, as the case may be, to move them out of engagement with their respective gear wheels. I thus succeed in providing means in the driving and driven shafts for three conditions, the idle condition and two speeds. In addition to the foregoing there is provided somewhat similar means for directly engaging and disengaging the driving and driven shafts in axial alinement.

Another feature consists in providing along with the foregoing a reversing means.

One of the important advantages of the arrangement is that the parts are turned from the idle position to the two change speed positions and the reverse position by one lever. The direct drive is controlled by a separate lever.
The full nature of this invention will be understood from the accompanying drawings and the following description and claims.

In the drawings Figure 1 is a plan view of the mechanism including the invention, parts being broken away and some positions of the parts being indicated by dotted lines. Fig. 2 is a transverse section on the line 2—2 of Fig. 1. Fig. 3 is a longitudinal section on the line 3—3 of Fig. 1. Fig. 4 is a transverse section on the line 4—4 of Fig. 3. Fig. 5 is a section on the line 5—5 of Fig. 1. Figs. 6 and 7 are perspective views of the pivoted clutch keys, which control the gears of the driving shaft. Fig. 8 is a section on the line 8—8 of Fig. 1 showing the parts in their unoperated position. Fig. 9 is a section on the line 9—9 showing the parts in their unoperated position. Fig. 10 is the same as Fig. 9 showing the parts in their operated positions. Fig. 11 is a section somewhat similar to Fig. 3 but showing the parts in position for medium speed, and the clutch rings being shown by dotted lines in position for reverse movement of the driven shaft. Fig. 12 is a similar view showing the parts in position for low speed.

The mechanism is included in a suitable casing, the lower half or portion of which 10 is herein shown. 11 is the driving shaft mounted in said casing and driven by means not shown. 12 is the driven shaft mounted also in the casing and the invention lies in the means for controlling the transmission of power from the shaft 11 to the shaft 12. Said shafts are in alinement and shaft 12 has a coaxial projection 13 fitting in a recess 14 in the shaft 11. The inner end of the driving shaft 11 is provided with three short grooves or recesses 15 providing three shoulders 16, much like a ratchet wheel, see Figs. 2 and 3.

The direct drive between the shafts 11 and 12 is effected by pivoted keys 20 on the driven shaft being forced into the groove 15 and against the shoulder 16 of the driver 11. There are three of the keys 20 arranged equidistant around the shaft 12 and pivoted at 21 and long enough to project beyond the end of the shaft 12 in engagement with the shaft 11. A shaft 12 is provided with grooves 22 in which the keys 20 are mounted and in which they are fully embedded when they are depressed to interlocking position with the shaft 11. They are held out of interlocking engagement with said shaft 11 by springs 23 that are embedded in the shaft 12 and project into the grooves 22 and are embedded in the keys 20, as shown in Fig. 3. When the keys 20 are in the position shown in Fig. 3, there is no direct connection between shafts 11 and 12, but this connection is brought about by the depression of the keys 20 by a laterally sliding clutch ring 24, which surrounds the shaft 12 and has a roller 25 between it and the shaft 12 in position to engage the key 20 when the ring is moved to the right from the position shown in Fig. 3. The lateral movement of said ring is caused by the lever 26, which is fulcrumed on the pin 27 secured to the casing, see Fig. 1.

The medium speed of the mechanism is attained through the following means: The driving shaft 11 has a gear 30 mounted on it that meshes with the gear 31 secured on the countershaft 32, which is mounted in the casing parallel with the shafts 11 and 12. It bridges the ends of said shafts 11 and 12 and at its other end has another gear 34 secured, which meshes with the gear 35 on the driven shaft 12. The gears 30 and 35 are not rigidly mounted. Within each of said gears the shafts 11 and 12 are provided with longitudinal grooves, in which two pivoted clutch keys 41 and 42 are mounted side by side, as appears in Figs. 3 and 4, and there are three pairs of said keys located equidistant in said shaft and within said gears. At their ends they are fulcrumed within said recesses or grooves, and spiral springs 43 embedded in the shafts and keys tend to press the free ends of the keys outwardly into engagement with the internally arranged ratchets 45 in said gear wheels. The keys 41 are used to clutch the gear 30 while the keys 42 are used to clutch the gear 35, so the two gears are clutched by somewhat similarly formed keys. The keys for the two gears also extend in opposite directions, each being fulcrumed near the end of the shaft in connection with which it is mounted. Each gear wheel 30 and 35 has guide rings 46 secured to each side thereof and projecting radially into annular grooves in the shafts 11 and 12 whereby said gears and rings are mounted on the shafts revolubly, and yet they can have no lateral movement on the shafts. Hence the keys 41 and 42 are recessed at 48 and 49 to avoid the inner ring 46 on the inner side of each gear 30 and 35, and that leaves projections on the outer ends of the keys to engage the ratchets 45 of the gears, when the keys are pressed outwardly by the springs 43; but the keys do not engage the gears 30 and 35 when the keys are depressed by the rollers 25 in the laterally sliding rings 50, which are actuated by the frame 51, which connects rings 50 and to which the hand lever 52 is pivoted that is fulcrumed on the pin 27, see Fig. 1. When the parts are in the position shown in Fig. 3 they are in their idle position, and power is not transmitted to the driven shaft. For low speed the parts are in the position shown in Fig. 11, where the key 41 on the driven shaft is released and in engagement with the gear 30, while the key 42 on the driven shaft is released and in engagement with the gear 35. At that time the rings 50 are in a somewhat intermediate position, the right-hand ring engaging an elevated portion of the key 42 and holding it disengaged and lying over the recess 148 in the key 41 and thus releasing it; while the left-hand ring is out of engagement with the key 42, so that it is in engagement with the gear 35; but said left-hand ring is holding down the key 41 in disengaged position, therefore, power will be transmitted from the driving shaft through the gear 30 to the driven shaft through the gear 35. The medium or reduced speed is obtained by reason of the size of the gears, 30, 31, 34 and 35.

The low drive is obtained by the following means: There is a gear 60 on the driving shaft 11 meshing with a gear 61 on a countershaft 62 that parallels and bridges the shafts 11 and 12 and is opposite the countershaft 32. Said countershaft 62 has a gear 63 keyed thereon. It meshes with the gear 64 on the driven shaft 12. The reduction of speed through the means just described is obtained by reason of the sizes of the gears 60, 61, 63 and 64. The gear 70 is constructed like gear 35 and there is a key 72 pivoted at 73 in the recess 71 in shaft 62. The key is pressed outwardly by spring 74 and is depressed or disengaged by the sliding ring 76, which is connected with and actuated by the frame 51 so that it moves simultaneously with the two rings 50.

For reversal the parts are in the position shown in Figs. 12 and 5. The rings 50 and 76 are all thrown to their right-hand limit by a left-hand throw of the lever 52. Then the right-hand ring 50 engages the elevation 149 on the key 41 and disengages it from the gear 30. At the same time said right-hand ring is over the recess 49 in the key 42, thus releasing said key and locking the gears 60 with the shaft 11. At the same time the left-hand ring 50 is holding down the key 41 but is out of engagement with the key 42, which is in locking engagement with the gear 35, as before. Power is transmitted from the shaft 11 through gears 60 and 61 and shaft 62, and on that shaft the ring 76 is also at its right-hand movement disengaged and out of clutch with key 72, which therefore, is in locking engagement with the gear 70, so that power is transmitted from the shaft 62 to the gear 70 through intermediate gear 170 to the gear 35. For low speed the lever 52 is thrown to its right-hand limit, which moves the rings 50 and 76 to the left-hand limit, as shown by dotted lines in Figs. 11 and 5. In that position the right-hand ring 50 is in engagement only with key 41 so that the key 42 is released and in engagement with the gear 60, whereby power is transmitted to shaft 62. From that power is transmitted through the gear 63, see Fig. 5, that is keyed on the shaft 62, the key 72 extending through a recess 73 in said gear 63. The gear 63 meshes with gear 64 on the shaft 12, which is mounted similar to gear 35. Then the left-hand ring 50, as shown in dotted lines in Fig. 11, will force the key 42 down out of engagement with the gear and release the key 41 so it will lock the gear 64.

What I claim as my invention and desire to secure by Letters Patent, is:

1. Change speed mechanism including driving and driven shafts in alinement with each other, each of said shafts being provided with longitudinal slots, a plurality of gears revolubly mounted on each shaft over said slots and provided with internal ratchets or shoulders, gearing driven by some of said gears for effecting different speeds, clutch keys in said slots for engaging said gears on said shafts, and means simultaneously operated on both shafts for permitting the keys to engage one set of said gears and preventing the engagement of the other keys.

2. Change speed mechanism including driving and driven shafts in alinement with each other, each of said shafts being provided with longitudinal slots, a plurality of gears revolubly mounted on each shaft over said slots and provided with internal ratchets or shoulders, means driven by some of said gears for effecting different speeds, clutch keys in said slots for engaging said gears on said shafts, springs tending to force said keys outwardly, and means simultaneously operated on both shafts for permitting the keys to engage one set of said gears and preventing the engagement of the other keys.

3. Change speed mechanism including driving and driven shafts in alinement with each other, each of said shafts being provided with longitudinal slots, a plurality of gears revolubly mounted on each shaft over said slots and provided with internal ratchets or shoulders, means driven by some of said gears for effecting different speeds, clutch keys in said slots for engaging said gears on said shafts, said clutch keys in each shaft being located side by side and the outer surfaces being provided with elevated and recessed portions, springs tending to force said keys outwardly, rings on both of said shafts surrounding the keys and in fixed relation to each other, and means for simultaneously sliding said rings in either direction over said keys, whereby all the keys may be depressed when the rings are in one position and either set of keys be released when the rings are in other positions, the arrangement of the keys, however, being such that when one set of keys is released by said rings, the companion keys will be depressed.

4. Change speed mechanism including a longitudinally slotted shaft, a pair of gear wheels revolubly mounted on the shafts over said slot and provided with internal ratchets or shoulders, a pair of clutch keys in said slot and pivoted to the shaft at one end, springs embedded in the shaft for forcing the free ends of the keys into engagement with the respective gears, there being one key for each gear, a ring laterally slidable on said shaft for depressing said keys excepting when over a recess in the keys, both of said keys having elevated surfaces near the fulcrums thereof, whereby the ring will pass over both of the keys and render the gears idle, and the keys being oppositely recessed and elevated so that when the ring is in one position it will depress one key and release the other into engagement with its gear, and in another position the rings will depress the last mentioned key and release the other key for engagement with its gear.

5. Change speed mechanism including driving and driven shafts in alinement with each other, a countershaft parallel with and bridging the ends of said shafts, gears secured on said countershaft, gears revolubly mounted on said driving and driven shafts to mesh with the gears on the countershaft, the dimensions of said gears being such as to produce the desired speed, clutch keys in said shafts for locking the gears thereon with the shafts, springs for actuating said keys, a ring slidably mounted on each shaft in position to engage said keys, a frame with which said rings are connected, and a lever for laterally sliding said frame, whereby said rings may be simultaneously moved to release or permit the engagement of said clutch keys.

6. Change speed mechanism including driving and driven shafts in alinement with each other, a countershaft mounted on each side of said shafts and bridging the ends thereof, gears secured on one of said countershafts, gears revolubly mounted on said driving and driven shafts meshing with said countershaft gears, an additional gear loosely mounted on the driving shaft, a gear secured on the other countershaft meshing with said additional gear on the driving shaft, a gear revolubly mounted on said last mentioned countershaft, clutch keys mounted in said driving and driven shafts in position to engage the gears thereon, a clutch key mounted in the last mentioned countershaft in position to engage the revoluble gear thereon, springs for forcing said keys into engagement with the gears, a single means for controlling all of said keys simultaneously, and an intermediate gear between the gear on the driven shaft and the revoluble gear on the countershaft, whereby one set of gears may drive the driven shaft at one speed and the other set of gears may drive it at another speed.

7. Change speed mechanism including driving and driven shafts in alinement with each other, a countershaft mounted on each side of said shafts and bridging the ends thereof, gears secured on one of said countershafts, gears revolubly mounted on said driving and driven shafts meshing with said countershaft gears, an additional gear loosely mounted on the driving shaft, a gear secured on the other countershaft meshing with said additional gear on the driving shaft, a gear revolubly mounted on said last mentioned countershaft, clutch keys mounted in said driving and driven shafts in position to engage the gears thereon, a clutch key mounted in the last mentioned countershaft in position to engage the revoluble gear thereon, springs for forcing said keys into engagement with the gears, a single means for controlling all of said keys simultaneously, an intermediate gear between the gear on the driven shaft and the revoluble gear on the countershaft, an additional gear on the driven shaft revolubly mounted and adapted to be locked with the shaft by keys therein, and a gear secured on said last mentioned countershaft for engaging said additional gear on the driving shaft, whereby the driven shaft may be driven in one direction at two different speeds or reversed under the influence of one key controlling means.

8. Change speed mechanism including driving and driven shafts in alinement with each other with their ends abutting, gears revolubly mounted on said shafts and provided with internal ratchets, a collar secured on each side of each gear and projecting into peripheral grooves in the shaft, whereby the gear will be revoluble but can have no lateral movement on the shaft, means for transmitting power from the gear on the driving shaft to the gear on the driven shaft, and means mounted in connection with the shafts for clutching the ratchets in said gears.

In witness whereof, I have hereunto affixed my signature in the presence of the witnesses herein named.

KENNETH W. GANT.

Witnesses:
G. H. BOINK,
O. M. McLAUGHLIN.